United States Patent Office 2,837,892
Patented June 10, 1958

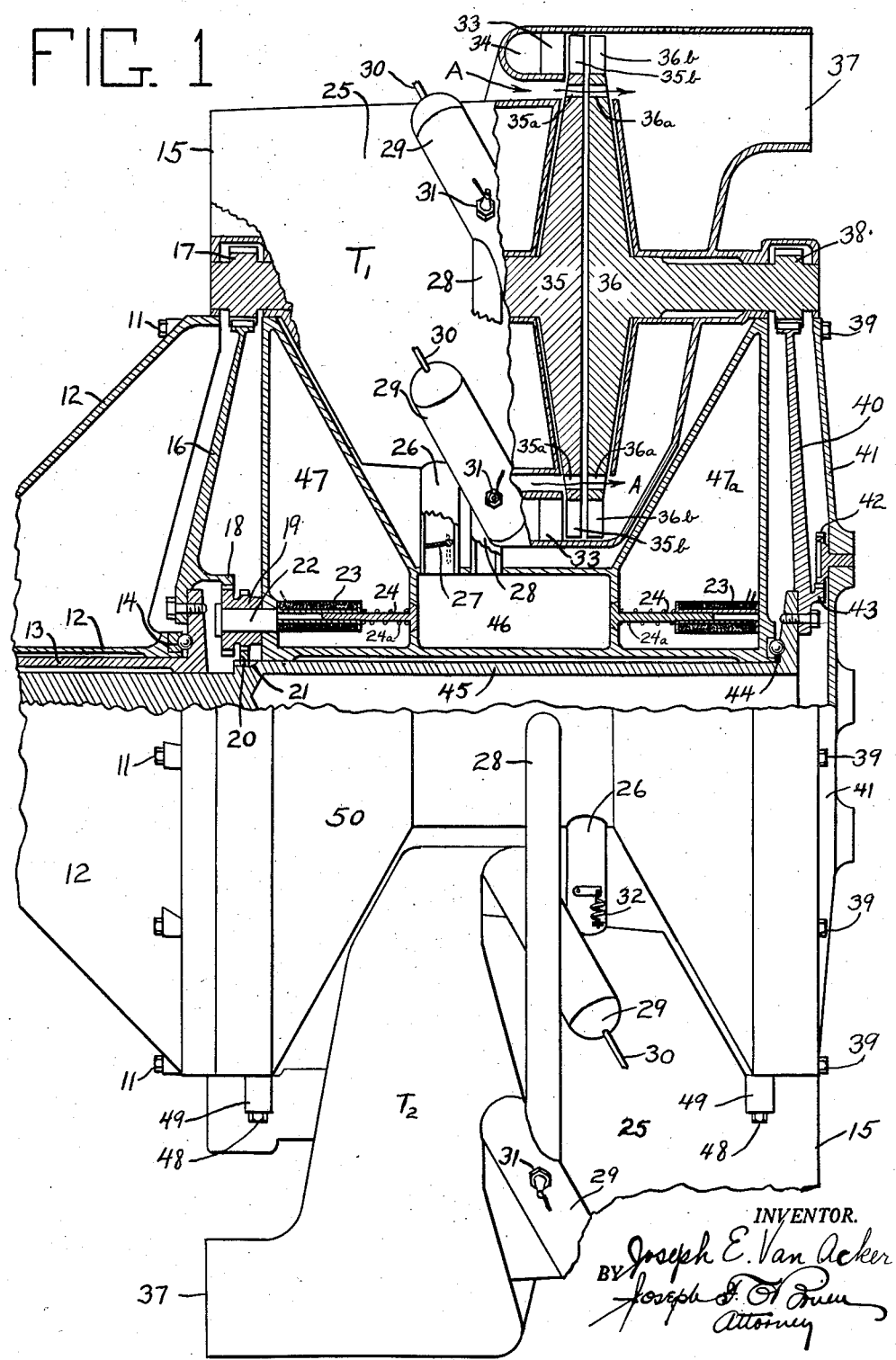

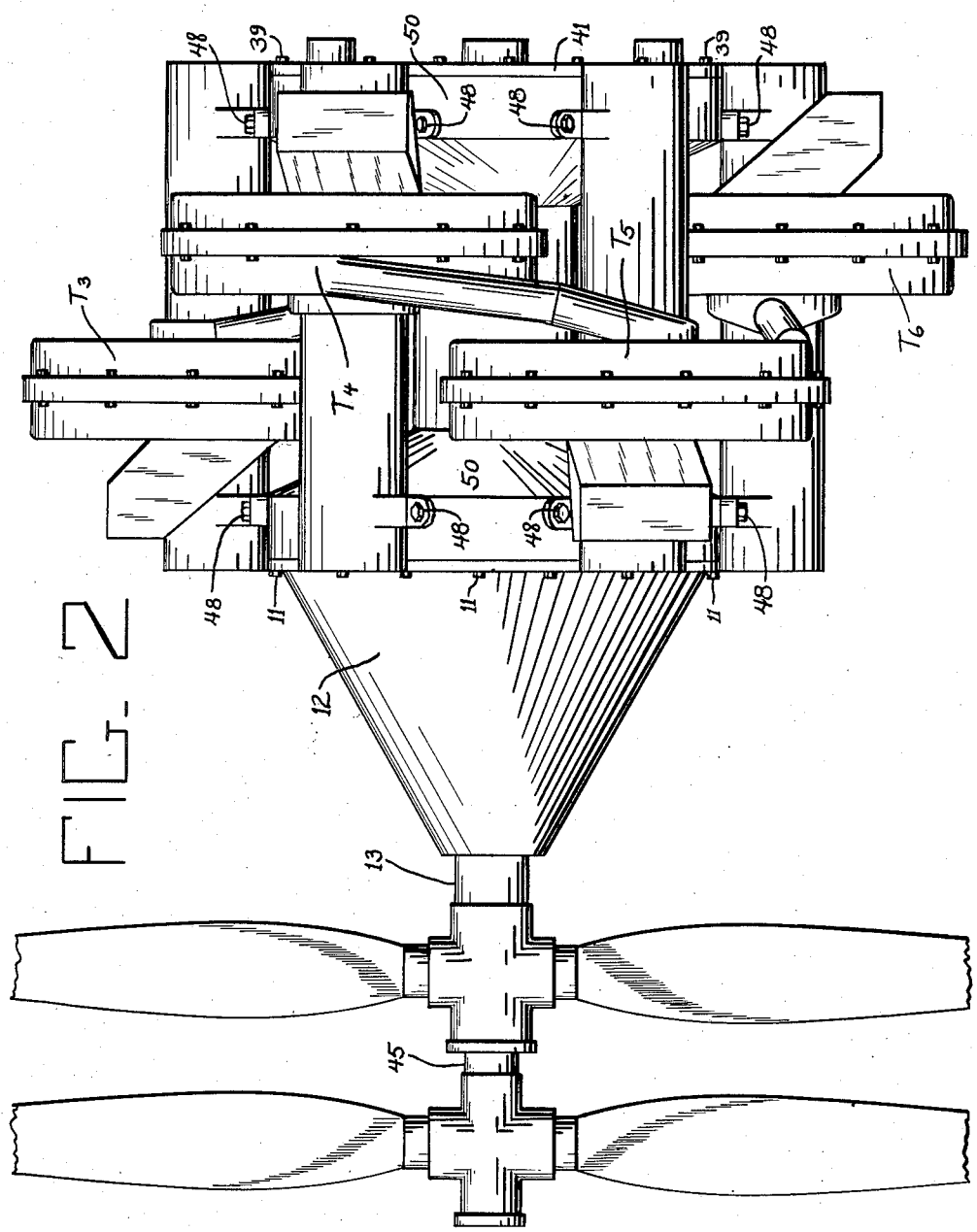

2,837,892

COMBUSTION GAS TURBINE ASSEMBLY EMBODYING A PLURALITY OF LIKE TURBINE MEMBERS

Joseph E. Van Acker, Haledon, N. J.

Application October 8, 1949, Serial No. 120,288

5 Claims. (Cl. 60—39.15)

This invention relates to combustion gas turbines and comprises a continuation in part of my copending application Serial No. 545,292, filed July 17, 1944, now abandoned.

More particularly this invention relates to gas turbines adapted for the propulsion of aircraft.

One of the objects of this invention is to provide a construction which will permit a turbine to operate with higher-temperature driving-gases than has been possible heretofore, and thereby increase its mechanical and thermal efficiency and to this end, the construction features a turbine dimension change as manifested by a plurality of turbines and a turbine blade-cooling method embodying conduction of heat to a cooled blade root.

Another object is to provide a turbine construction which will minimize the gyroscopic forces which are detrimental to the flight control of an aircraft.

Still another object is to provide a construction which will facilitate the service and repair of the turbine.

A further object is to provide a construction which will have a low weight per horsepower ratio.

A still further object is to provide in a turbine of the type herein specified, means for balancing the torques transmitted by the drive shafts.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which—

Fig. 1 is a fragmentary section of an air-cooled assembly of turbines embodying my invention; and Fig. 2 is a view in side elevation of an assembly of liquid-cooled turbines embodying my invention and which comprise a series of like liquid-cooled turbines mounted about a common propeller shaft and having a common nose-cover, such as shown in Fig. 1.

In accordance with my invention, I construct my turbine assembly of a plurality of substantially like, and functionally identical turbines which may be of any type or design and which are coupled to a common drive shaft. Such employment of a plurality of like turbines enables a general reduction in turbine diameter and a proportional reduction in blade length and width. The reduction in power output as a result of the reduced dimensions necessitates a turbine assembly of a plurality of turbines. Therefore, the application of my invention is limited to those turbine assemblies in which the driving combustion gases are equally expanded in each of a plurality of turbines, i. e., the pressures of the combustion gases entering each of the turbines are substantially equal and the exhaust gases also leave each of the turbines at another substantially equal pressure.

Each of the turbines is cooled by circulating a cooling fluid over the turbine wheel, and more particularly over the turbine blade roots, so that the blade cooling is accomplished by conduction of the heat to the cooled blade roots. The use of blade root cooling combined with the general reduction in turbine blade dimensions results in an increase in cooling efficiency which permits either an increase in the temperature of the combustion gases or an increase in service life.

The increase in cooling efficiency is attributed to the following factors:

(1) A reduction in turbine blade surface area as a result of the general reduction in dimension causes a decrease in the amount of heat absorbed from the combustion gases, but—

(2) a corresponding decrease in turbine blade cross sectional area also causes a corresponding decrease in the rate of thermal conduction to the blade root, so that—

(3) the decrease in the amount of heat absorbed is balanced by the decrease in heat conduction, resulting in—

(4) a temperature difference per unit blade length that is constant regardless of turbine blade dimensions. Therefore, under like conditions of gas temperature and blade root temperature, (5) a small turbine, having small turbine blade dimensions will have a lower blade tip temperature than a larger turbine which has correspondingly longer, wider, and thicker blades. Therefore, a turbine assembly of a plurality of like turbines will operate with higher temperature gases, or will have a longer service life than a single turbine of equal power.

Direct blade cooling, as I employ it, is best applied to those turbines in which the combustion gases are fully expanded before they impinge on the blades and little or no expansion takes place in the blades themselves.

The use of a plurality of like turbines to enable a reduction in turbine dimensions results in weight per horsepower advantages, particularly when the gas turbine is used to drive aircraft propellers through reduction gearing. The reasons for this weight per horsepower advantage is that the weight per horsepower is reduced in direct proportion to a reduction in turbine diameter. Thus, if a 20 inch diameter turbine weighed 1000 pounds and developed 1000 horsepower or 1 pound per horsepower, reducing the turbine diameter to 10 inches would result in an individual turbine weighing 125 pounds and producing 250 horsepower or .5 pound per horsepower. An assembly of four 10 inch diameter turbines would collectively produce the same 1000 horsepower that the 20 inch diameter would produce, but with a total weight of only 500 pounds, exclusive of integrating structure which is also used to support a reduction gearing, it being understood that all aircraft turbines used to drive aircraft propellers require reduction gearing. For a given turbine blade velocity, the turbine pinion pitch-line velocities will be equal for turbines of any diameter if the turbine pinion diameters are proportional to turbine diameters. Small turbines have small pinions and large turbines have large pinions. Therefore, the final propeller shaft speed in any turbine will be proportional to the diameter of the reduction gear which is driven by the pinion. And since the possible diameters of reduction gears in both single large turbines and turbine assemblies of a plurality of small turbines are practically the same, the high rotational velocity of a small turbine will not cause difficulty insofar as gear operation is concerned. In fact, employing a plurality of turbines distributes the load over several places on the reduction gear and permits gears of lighter cross section and narrower-width of face. The simple gear train which can be used with my turbine eliminates the difficulties involved with planetary gear trains which are often used in aircraft turbines.

Also, in my turbine, the reduction gear and propeller-shaft supporting-structure serves the dual function of supporting and integrating the plurality of small turbines into an assembly in such a manner that the weight per horsepower advantages of the use of small diameter turbines are fully retained.

In addition to the above recited thermal and weight advantages obtained from a reduction in turbine diameter, an additional advantage is obtained in the form of a large reduction in gyroscopic forces. The reduction in gyroscopic forces is proportional to one quarter of the fourth power of the change in turbine diameter; e. g., a reduction in turbine diameter from 20 inches to 10 inches results in gyroscopic forces in the 10 inch turbine that are 1/64 the forces in the 20 inch turbine. As a result, the turbine-supporting structure may be made lighter and the flight control of an aircraft is facilitated. The gyroscopic forces can be reduced still further by operating turbine rotors in contra-rotation or by causing the axes of turbines to be positioned in out of parallel registration with each other.

Referring now to the drawings, the turbine consists of two or more substantially like or identical turbines T1, T2 (Fig. 1) or T3, T4,, T5, T6 (Fig. 2) supported on a central casing made up of a nose cover 12, a main casing 50, and a rear cover 41.

The nose cover 12 encloses and supports an outer shaft 13 to which is rigidly secured reduction gear 16. Ball thrust bearing 14 takes the end thrust imposed on shaft 13. The nose cover is secured to the main casing 50 by means of cap screws 11. Removing cap screws 11 permits the entire nose cover, outer shaft and reduction gear to be removed for service.

The main casing 50 encloses and supports an inner shaft 45 to which is rigidly secured another reduction gear 40, and outer shaft 13 and co-axial inner shaft 45 shown in Fig. 2 of the drawings comprise a common shaft for the transmission of power to the propeller system. Ball thrust bearing 44 takes the end thrust imposed on shaft 45. Three chambers are formed within the main casing. Chambers 47 and 47a are identical and are starting-air storage chambers. Identical valves 24, normally kept in a closed position by light springs 24a may be opened by solenoids 23 operable on the act of closing the ignition switch (not shown). Chamber 46 is a combustion compressed air distributing chamber. Double gear 19 is rotatably mounted on stud 22 which is also supported by the main casing 50. Gear 18, formed integrally with reduction gear 16, meshes with one of the gears comprising double gear 19. An internally splined gear 20 drivably connected to inner shaft 45 by means of splines 21 meshes with the other of the gears comprising double gear 19. Both of the gears comprising double gear 19 have the same number of teeth, while both gear 18 and gear 20 also have equal numbers of teeth. Since the stud 22 is stationary, and because the ratios between the gears are the same, inner shaft 45 and outer shaft 13 will rotate at the same speed but in opposite directions.

Rear cover 41 is provided to support accessory drive gears 42 which are used to drive such accessories as fuel pump, generator, tachometer, etc. Gears 42 are driven from gear 43 which is formed integrally with reduction gear 40. The rear cover is secured to the main casing by means of cap screws 39. Removing cap screws 39 permits the rear cover 41, reduction gear 40, and inner shaft 45 to be removed for service.

Each of the turbines T1, T2 comprises a compressor 25 which may be of any suitable type or form with an air inlet 15, and contrarotating turbine rotors 35, 36. Air compressed by the air compressor 25 is conducted by means of conduit 26 into chamber 46. An unbalanced butterfly valve 27, normally kept closed by spring 32 is located in said conduit 26. Flow of air from compressor 25 opens said valve 27, but said valve is automatically operable to prevent reverse flow from chamber 46 through compressor 25 to the atmosphere.

Compressed air is conducted from chamber 46 through conduit 28 into combustion chamber 29 where said air is mixed with fuel entering through pipes 30. The compressed air-fuel mixture is ignited by igniter 31, and the hot combustion gases are conducted through chamber 34 and nozzles 33 to impinge successively against blades 35b and 36b, said impingement causing turbine rotors 36 and 35 to rotate in opposite directions. After impingement, the gases are exhausted through exhaust pipe 37. Pinions 17 and 38, rigidly secured to turbine rotors 35 and 36, respectively, drive reduction gears 16 and 40, respectively, in opposite directions. Each of the turbines T1, T2 or T3, T4, T5, T6 is fastened to the main casing by means of cap screws 48, which pass through bosses 49. Removing cap screws 48 and removing conduits 26 and 28 permits the entire turbine unit to be removed for service.

Cooling air is caused to follow the path of the arrows A through turbines T1, T2 either by virtue of the movement of the turbine through the air or by induction due to the movement of the exhaust gases. This cooling air passes through passages 35a and 36a, effectively cooling the bases of the turbine blades 35b, 36b.

In the course of operation of my turbine, one turbine rotor will usually produce a higher torque than another. This is due to the fact that the first row of blades upon which the gases impinge will absorb almost three-fourths of the total power of each of the turbines. If the first row of blades is always toward the front of the turbine, the outer shaft 13 will have a much higher torque than the inner shaft 45. This is a generally undesirable characteristic and therefore I show turbine T1 as having the gases first impinge on the front row of blades, while turbine T2 has been reversed on the supporting main casing 50 so that the gases first impinge on the rear row of blades. This somewhat balances the torques developed on each shaft. There may still be some unbalance due to differences in the power developed by each of the small turbine units. For this reason, I provide the differential equalizing mechanism which is composed of the 1:1 ratio epicyclic gear train 18, 19 and 20. A bevel gear train could serve equally as well.

The turbine is started by first pumping fuel by means of a hand pump (not shown) into the combustion chambers. After the fuel has been flowing for a few seconds, the ignition switch (not shown) is closed which simultaneously causes the ignitors to ignite the fuel air mixture already in the combustion chamber, and valves 24 to open, releasing the compressed air in chambers 47, 47a. Valve 27 prevents the compressed air escaping through the compressor, and the air then must pass into the combustion chamber where it supports combustion and gives the initial impulse to start the rotation of the turbines and compressors. As soon as the compressor starts passing air into the chamber 46, the turbines will continue operation and the fuel pumps driven by the accessory drives will take over the function of fuel supply. After the turbines have reached normal operating temperature, the combustion will continue without benefit of ignitors, and the ignition switch may be opened. This will permit valves 24 to close. Valve spring 24a is sufficiently light so that a portion of the high pressure air in chamber 46 will pass valve 24 and will be stored in chambers 47 and 47a.

Having described my invention, I claim:

1. A combustion gas turbine assembly comprising a substantially spool shaped casing, reduction gear means enclosed within each of the end portions of said spool shaped casing, a pair of shafts coaxial with said central casing and with each other and connected to said reduction gear means, and a plurality of like turbines spaced about the periphery of said casing and nested between the end portions of said casing in driveable connection with said reduction gear means.

2. A combustion gas turbine assembly comprising a central casing, a chamber within said casing, air compressing means adapted to discharge compressed air into said chamber, a plurality of like turbines arranged about the periphery of said casing, combustion chambers operable in connection with said plurality of turbines, and air conduit means to conduct compressed air from said chamber in said casing to said combustion chambers.

3. A combustion gas turbine assembly comprised of coaxial contra-rotating shafts, reduction gearing, and a plurality of like turbines, each of said turbines having two rotors driven in contra-rotation by successive impingements of combustion gases, one of said rotors connected through said reduction gearing to the inner of said coaxial shafts and the other of said rotors connected through said reduction gearing to the outer of said coaxial shafts, a proportionate number of said turbines being adapted to cause initial impingement of the combustion gases to drive the rotor connected to the inner of said coaxial shafts, and another proportionate number of said turbines being adapted to cause initial impingement of the combustion gases to drive the rotor connected to the outer of said coaxial shafts whereby the power transmitted through each of the coaxial shafts shall be more evenly balanced.

4. A combustion gas turbine assembly as claimed in claim 3 plus a gear train connected between said coaxial shafts to completely balance the power transmitted through each of the coaxial shafts, said gear train comprising gears connected to and rotating with each of the coaxial shafts, a secondary gear or gears in mesh with each of the gears connected to each of the coaxial shafts, said secondary gear rotatably mounted on a stationary stud, the ratio between each of said gears connected to said coaxial shafts and their meshing secondary gears being the same, and all of the secondary gears rotating at the same speed.

5. A combustion gas turbine assembly comprising a plurality of like turbines supported on a central casing, said central casing comprising a main member and two end-cover members, paired reduction gears enclosed within said central casing, paired coaxial shafts having driving connections with said paired reduction gears and supported by one of said end-cover members, accessory-gear means adapted for the driving of accessory devices, said accessory-gear means driveably connected with one of said coaxial shafts and supported by the other of said end-cover members, and pinions connecting said plurality of like turbines to said paired reduction gears, said paired reduction gears and coaxial shafts being driven in contra-rotation.

References Cited in the file of this patent

UNITED STATES PATENTS

| | | |
|---|---|---|
| 990,222 | Brown | Apr. 25, 1911 |
| 1,331,559 | Eddington | Feb. 24, 1920 |
| 1,935,539 | Belluzzo | Nov. 14, 1933 |
| 2,073,191 | Belluzzo | Mar. 9, 1937 |
| 2,160,281 | Price | May 30, 1939 |
| 2,273,406 | Lasley | Feb. 17, 1942 |
| 2,280,765 | Anxionnaz | Apr. 21, 1942 |
| 2,371,889 | Hermitte | Mar. 20, 1945 |
| 2,584,899 | McLeod | Feb. 5, 1952 |
| 2,601,194 | Whittle | June 17, 1952 |
| 2,613,749 | Price | Oct. 14, 1952 |
| 2,626,501 | Pavlecka et al. | Jan. 27, 1953 |

FOREIGN PATENTS

| | | |
|---|---|---|
| 504,263 | Great Britain | Apr. 21, 1939 |
| 593,403 | Great Britain | Oct. 16, 1947 |